United States Patent [19]

Crosby

[11] Patent Number: 5,640,841
[45] Date of Patent: Jun. 24, 1997

[54] PLASMA TORCH IGNITION FOR LOW NO$_x$ COMBUSTION TURBINE COMBUSTOR WITH MONITORING MEANS AND PLASMA GENERATION CONTROL MEANS

[76] Inventor: Rulon Crosby, 510 Lacey Way, North Salt Lake City, Utah 84054

[21] Appl. No.: 436,746

[22] Filed: May 8, 1995

[51] Int. Cl.⁶ ........................................... F02C 7/26
[52] U.S. Cl. ................. 60/39.06; 60/39.281; 60/39.821; 60/39.826; 219/121.54
[58] Field of Search .................. 60/39.06, 39.281, 60/39.36, 39.37, 39.821, 39.826, 732, 740, 746, 747, 748; 219/121.54, 121.55

[56] References Cited

U.S. PATENT DOCUMENTS

| | | | |
|---|---|---|---|
| 3,643,430 | 2/1972 | Emory, Jr. et al. | 60/747 |
| 4,035,131 | 7/1977 | Ceranowicz | 60/39.06 |
| 4,292,801 | 10/1981 | Wilkes et al. | 60/39.06 |
| 4,439,980 | 4/1984 | Bilblarz et al. | 60/740 |
| 4,650,953 | 3/1987 | Eger et al. | 219/121 PQ |
| 4,938,019 | 7/1990 | Angell et al. | 60/39.827 |
| 5,121,597 | 6/1992 | Urushidani et al. | 60/740 |
| 5,220,795 | 6/1993 | Dodds et al. | 60/747 |
| 5,257,500 | 11/1993 | Venkataramani et al. | 60/39.821 |
| 5,296,667 | 3/1994 | Marantz et al. | 219/121.54 |
| 5,349,811 | 9/1994 | Stickler et al. | 60/39.281 |
| 5,367,869 | 11/1994 | DeFreitas | 60/39.06 |
| 5,404,712 | 4/1995 | Few et al. | 60/39.821 |
| 5,442,907 | 8/1995 | Asquith et al. | 60/39.821 |
| 5,487,266 | 1/1996 | Brown | 60/39.06 |
| 5,515,681 | 5/1996 | DeFreitas | 60/39.821 |
| 5,565,118 | 10/1996 | Asquith | 219/121.54 |

OTHER PUBLICATIONS

Westinghouse Combustion Turbine Low NO$_x$ Technology Update, By D.M. Thompson et al. pp. 1–10 Nov. 1993.

*Primary Examiner*—Timothy Thorpe
*Assistant Examiner*—Ted Kim
*Attorney, Agent, or Firm*—Thorpe North & Western, L.L.P.

[57] ABSTRACT

A low NO$_x$ combustion turbine combustor which utilizes an electric arc plasma torch to heat natural gas or another fuel to a sufficiently high temperature to create a plasma which is injected into a combustor causing the auto-ignition and sustained combustion of the lean fuel/air mixture within the combustor. The plasma is injected through a pilot flame nozzle into a combustion turbine combustor basket. The temperature and the volume of the injected plasma-heated fuel is precisely controlled to light-off the lean mixture in the combustor basket while minimizing the NO$_x$ production through elimination of the air required by the pilot flame of conventional turbine combustors.

10 Claims, 4 Drawing Sheets

PLASMA TORCH IGNITION FOR LOW $NO_x$ COMBUSTION TURBINE COMBUSTOR WITH MONITORING MEANS AND PLASMA GENERATION CONTROL MEANS

BACKGROUND OF THE INVENTION

1. Field of the Invention

This invention pertains to low $NO_x$ combustion turbine combustors. More particularly, the pilot flame, used to heat and ignite the fuel and air mixture within a turbine combustor, is implemented as an electric arc plasma torch. This enables heating and ignition of fuel within the turbine combustor without the associated need for combustion air introduced by a conventional pilot flame.

2. Prior Art

Various industries such as coal-fired electrical power generation and oil and gas production produce nitrogen oxide gases (e.g. NO, $N_2O$, $NO_2$, and $N_2O_4$), the key factor being combustion of fossil fuels. Nitrogen oxides (collectively referred to as $NO_x$) are primary air pollutants and, as such, provoke considerable interest in the development of efficient, cost-effective technologies to remediate $NO_x$-containing emissions. $N_2O$ is thought to be a major contributor to global warming due to its persistence in the atmosphere (about 150 years) and its relatively high infrared absorbance (>200 times that of carbon dioxide). William A. Apel & Charles E. Turick, *The Use of Denitrifying Bacteria for the Removal of Nitrogen Oxides from Combustion Gases*, 72 Fuel 1715 (1993). In view of the foregoing, it will be appreciated that a process of removing nitrogen oxides from processes that normally produce them would be of great benefit.

Turbine combustors are presently producers of nitrous oxide gases because they burn fossil fuels. The simplest combustion control technology for reducing $NO_x$ production is low-excess-air operation. A conventional combustor uses a pilot flame within the combustion turbine combustor basket to heat and thereby ignite the fuel and air mixture. The fuel and air mixture introduced into the combustor basket is kept lean so as to reach an optimal fuel/air ratio to minimize $NO_x$ produced by the turbine. Nevertheless, the pilot flame used to ignite the fuel-air mixture is a relatively fuel-rich flame. Consequently, the turbine produces $NO_x$ because the high temperatures within the rich pilot flame combine to form $NO_x$ from the excess nitrogen and oxygen in the pilot flame combustion air. Therefore, the pilot flame is the greatest source of $NO_x$ produced by combustion turbines.

It is apparent that while using a lean fuel mixture is an effective method of controlling $NO_x$ production within a turbine combustor, the benefits of this arrangement are substantially counterbalanced by the fuel-rich pilot flame used to ignite the lean fuel/air mixture. It would therefore be an advantage over the prior art if the combustion air of the pilot flame could be reduced in order to reduce overall $NO_x$ production from the combustion turbine combustor basket. It would also be an advantage if the pilot flame could be used to actually reduce $NO_x$ production by converting $NO_x$ back to $N_2$.

Another problem of the low-excess-air approach to reducing $NO_x$ emissions is that the combustor is subject to an instability in combustion of the fuel and air. This is mainly caused by the fact that if the fuel and air mixture is not mixed well, combustion within the combustor basket becomes erratic. This erratic state is manifested when the lean fuel/air mixture stops combusting momentarily until a sufficient concentration of fuel and air builds up again within the combustor basket and ignites. This flickering combustion effect within the combustor basket can become so violent that the turbine can tear itself apart from the constant reignition of fuel and air. Unfortunately, conventional chemical pilot flames are not able to adjust rapidly enough to changing conditions within the combustor basket. Therefore, it would be another advantage of the present invention if a pilot flame could be developed which could adjust rapidly enough to compensate for changing combustor conditions and fuel/air mixture ratios sufficient to stabilize combustion within the combustor basket.

OBJECTS AND SUMMARY OF THE INVENTION

It is an object of the present invention to provide a pilot flame that reduces or eliminates $NO_x$ from within the plasma-heated pilot flame.

It is another object of the present invention to provide a pilot flame that reduces overall $NO_x$ production from the turbine combustor and which does not require substantial modification to existing turbine combustor design.

It is yet another object of the present invention to provide a pilot flame that does not introduce pilot light combustion air within the combustor basket of the turbine.

It is a further object of the present invention to provide a plasma torch that does not increase $NO_x$ production of the turbine, and yet functions equally as well as fuel-rich pilot flames at igniting and maintaining combustion of the lean fuel/air mixture.

Still another object of the present invention is to provide a pilot flame which can stabilize combustion within the combustor basket by making nearly instantaneous adjustments to plasma temperature and volume to counteract destabilizing influences.

It is still a further object of the present invention to provide a pilot flame which can reduce overall $NO_x$ production of the combustion turbine by introduction of hydrogen radicals within the combustion turbine combustor.

These and other objects and advantages of the present invention are realized in a combustion turbine that utilizes an electric arc plasma torch to heat natural gas or another fuel to a sufficiently high temperature to cause the auto-ignition of the lean fuel/air mixture within the combustor basket. The electrically heated hot gas is injected through the pilot flame nozzle into a combustion turbine combustor basket. The temperature and the volume of the injected plasma-heated fuel is precisely controlled to light-off the lean mixture in the combustor basket while minimizing the $NO_x$ production through elimination of a air requirement within the pilot flame of conventional turbine combustors. Control of temperature and volume of injected plasma is also rapidly controlled to provide nearly instantaneous feedback adjustments to the plasma being injected into the combustor so as to counteract destabilizing combustion irregularities within the combustor.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
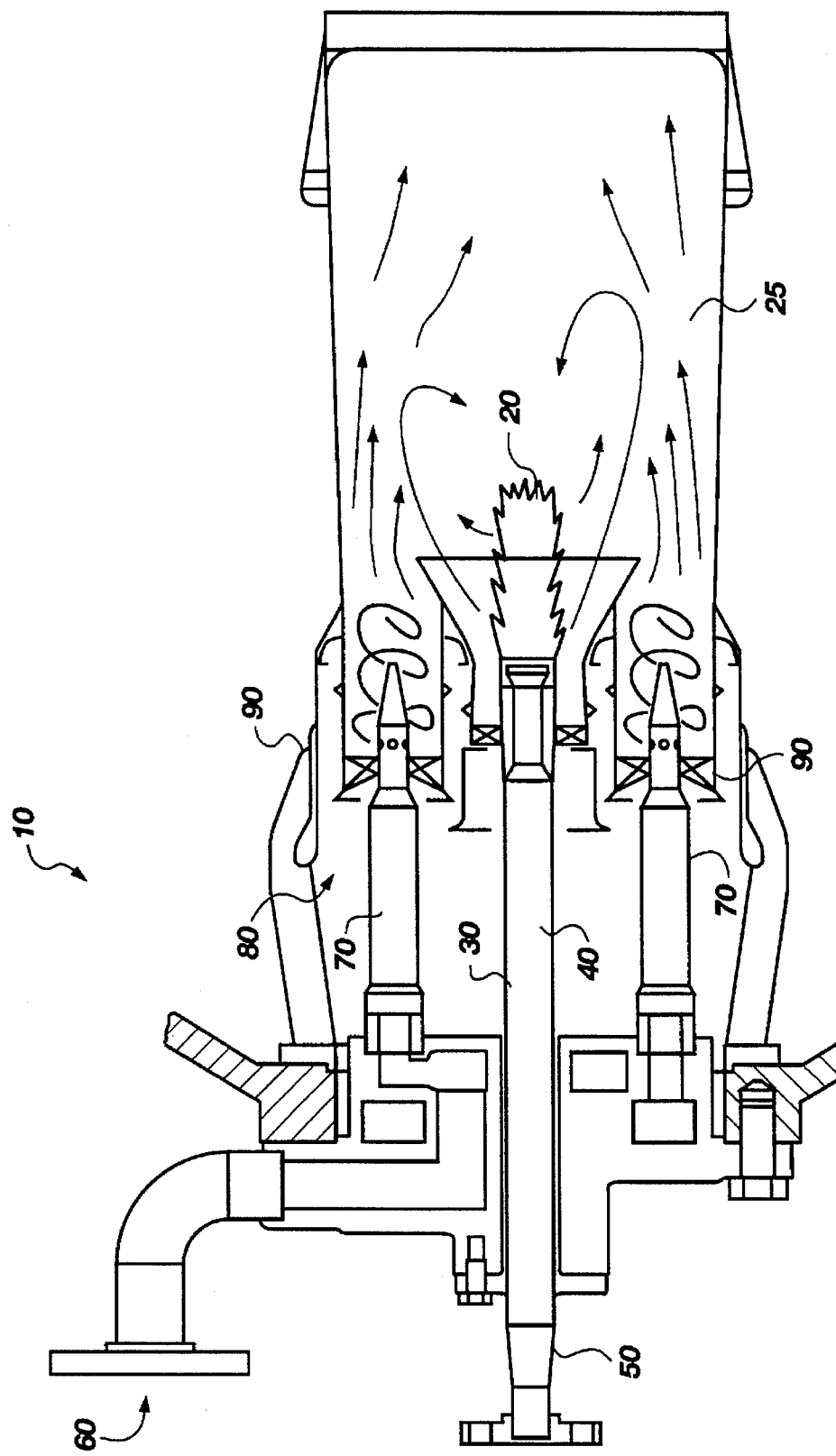
FIG. 1 is an elevational cross-section view of a combustion turbine used in the prior art.

FIG. 1 offers a view of a conventional low $NO_x$ combustion turbine combustor 10 used in the prior art. The heat required to ignite the lean burn fuel/air mixture is provided by a relatively fuel-rich pilot flame 20. The pilot flame 20 requires air to burn. Air provided for the pilot flame introduces substantial quantities of excess oxygen into the combustor basket 25 and is referred to as combustion air 30. The combustion air 30 is mixed with pilot light fuel 40 in the pilot light nozzle 50. The main fuel inlet 60 feeds fuel injection ports 70 (two shown in cross section). Inlet air 80 is mixed with fuel from the injection ports 70 by a swirler 90. The swirler 90 action produces the lean fuel/air mixture that is ignited by the pilot flame 20 in the combustor basket 25.

One of the major drawbacks of this combustion turbine combustor design is that combustion air 30 has been found to provide the majority of nitrogen and oxygen that are combined to form the $NO_x$ produced in the turbine combustor 10. Thus, despite the design of a combustion turbine that uses a lean fuel/air mixture within the combustor basket 25 to reduce $NO_x$ production, the cause of the majority of $NO_x$ emissions is a small pilot flame 20 that ignites and sustains the combustion reaction within the turbine combustor 10.

Figure 2:
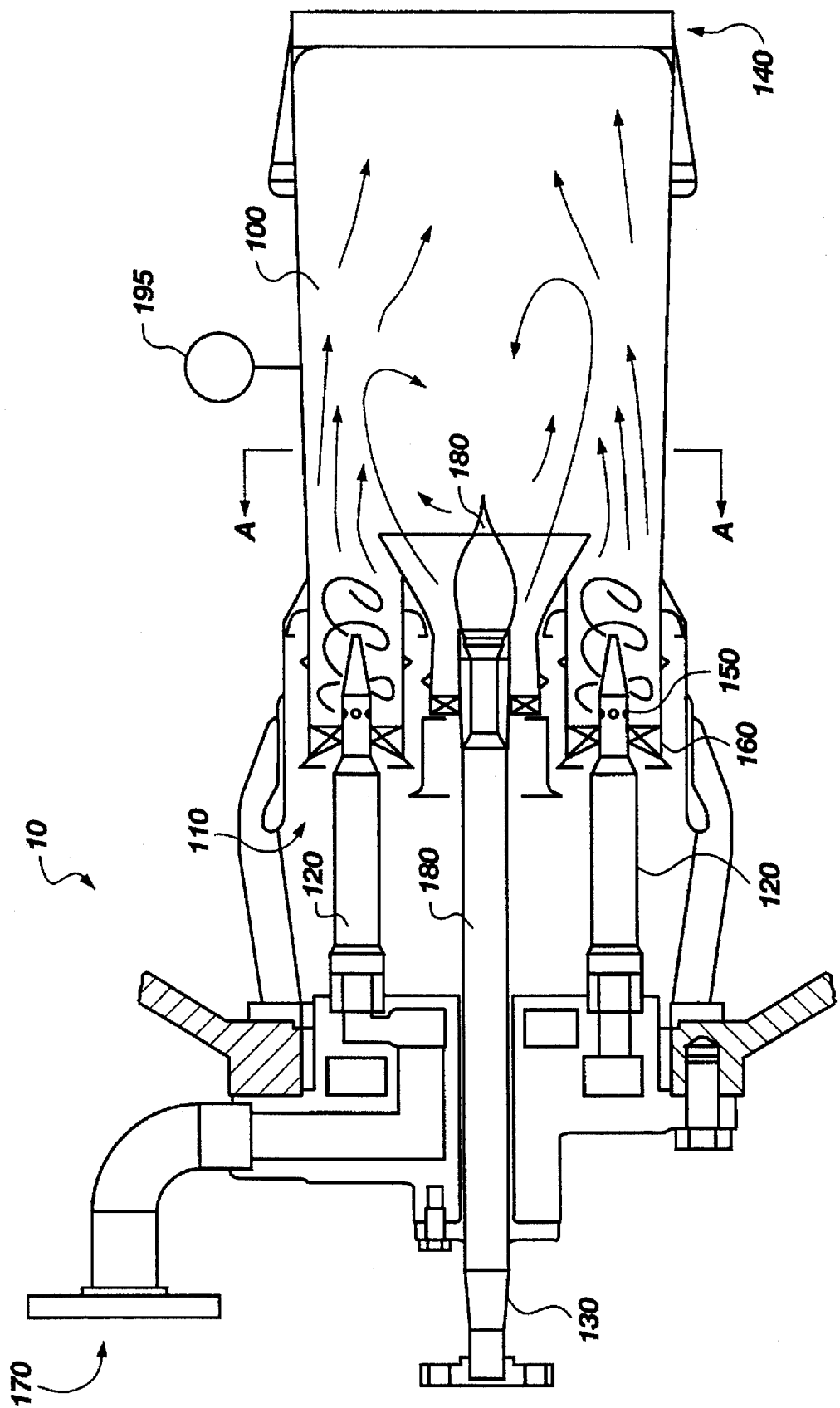
FIG. 2 is an elevational partially cross-section view of the combustion turbine combustor basket of the present invention showing replacement of the pilot flame with a plasma torch.

FIG. 2 is an illustration of the combustion turbine combustor 10 used in the present invention. The heart of the combustion turbine is the combustor chamber, referred to in the industry as a combustor basket 100. In the preferred embodiment of the present invention, the combustor basket 100 has the air inlets 110, fuel injection ports 120 and plasma torch pilot light nozzle 130 at one end of the combustor basket 100, and an exhaust port 140 at an opposite end.

The injection ports 120 are hollow tubes which come to a point and project into the combustor basket 100. The injection ports 120 are oriented so that the points of the injectors 120 are oriented so as to be aimed out the exhaust port 140. Four holes 150 are disposed on the circumference of each injection port 120 before it comes to a point. The holes 150 enable fuel from the main fuel inlet 170 to be sprayed from the sidewalls of the injectors 120 and into the combustor basket 100 at an angle perpendicular to a lengthwise axis of the tubular injector ports 120. Orienting the fuel injection is this manner allows air from air inlets 110 to have the maximum amount of time to mix with the fuel so that burning of the fuel/air mixture is complete and rapid. To assist this mixing of fuel and air, a swirler 160 at an angle of approximately 25 degrees is positioned at the base of the injection ports 120 directly in front of air inlets 110 so as to direct air flow past the fuel injection holes 150 and out of the exhaust port 140. The swirler 160 action also helps to maintain an even flow of air from the air inlets 110.

Figure 3:
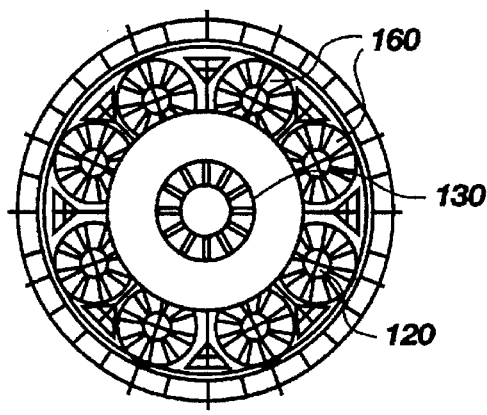
FIG. 3 is an elevational cross-section view of the present invention as seen along the perspective A-A as illustrated in FIG. 2.

This preferred embodiment of the present invention includes a circular arrangement of eight fuel injector ports 120 around an outer edge with a swirler 160 surrounding the base of each port 120 and is shown from a different angle in FIG. 3. At the center of the circular arrangement of ports is the plasma torch pilot light nozzle 130. A plasma torch coupled to the nozzle 130 is the key to the reduction of $NO_x$ by the combustion turbine 10.

Several operations occur simultaneously within the combustor basket 100 when in operation, an illustration of which will help demonstrate the advantages of the present invention. A fossil fuel is injected from the main fuel inlet 170 into the combustor basket 100 through the eight injector ports 120. The swirlers 160 draw air from the air inlets 110 into the combustor basket 100 and produce a small vortex around each fuel injector 120. The vortex helps to thoroughly mix the fuel and air for a clean and even burn. The swirling fuel/air mixture is propelled back towards the exhaust port 140. At this time, a torch fuel such as natural gas flows by an electric arc in a plasma torch (FIG. 4) upstream of the plasma torch pilot light nozzle 130. The arc heats the natural gas to create a highly ionized gas or plasma. The plasma 180 is injected into the combustor basket 100 from the plasma torch pilot flame nozzle 130. The temperature and volume of the plasma 180 discharged into the combustor basket 100 is carefully controlled so as to reach the auto-ignition temperature of the lean fuel/air mixture. The exhaust gases and heat produced from the combustion of the fuel/air mixture is then rapidly expelled from the exhaust port 140.

The plasma torch (FIG. 4, item 200) of the present invention will pass a fuel to the plasma torch pilot light nozzle 130 after heating the fuel to a temperature that is approximately equal to that of the pilot flame (FIG. 1, item 20) used in conventional combustors. However, the heated fuel or plasma 180 is created without the addition of combustion air required by conventional pilot lights. In effect, using a plasma torch eliminates the greatest source of $NO_x$ production materials from the turbine combustor 10. The only source of oxygen within the combustor basket 100 is then due exclusively to the air introduced into the combustor basket 100 that creates the lean fuel/air mixture for the turbine 10. Furthermore, substitution of the plasma torch for a conventional pilot flame does not create any differences in overall operation of the combustion turbine 10. The greatest operational difference is perhaps in the choice of pilot light fuels. A plasma torch will operate with fuels such as natural gas, hydrogen, fuels oils, etc.

Also illustrated in FIG. 2 is a monitoring device 195 coupled to the combustor basket 100. The monitoring device 195 in combination with a control device (FIG. 4, item 250) provide another advantage of the present invention which is explained in the detailed description of the control device in FIG. 4.

It should be understood that use of the plasma torch as the pilot flame in the combustor basket 100 does not eliminate $NO_x$ production. The inevitable subsequent formation of $NO_x$ in the burning lean fuel/air mixture, however, will be less than current $NO_x$ production levels in a combustor basket 100 with a conventional pilot flame. However, the present invention might also make possible the further reduction of total $NO_x$ produced by the fuel/air mixture. This reduction is possible because a fuel 190 containing hydrogen and heated by a plasma torch pilot light 130 will produce hydrogen radicals. Hydrogen radicals are capable of reducing $NO_x$ back to $N_2$. The result will be even less overall $NO_x$ production from the turbine 10 than is actually produced by the lean fuel/air mixture combustion process.

FIG. 3 is an elevational cross-section view of the present invention as seen along the perspective A—A as illustrated in FIG. 2. This is a view of the components in the combustor basket 100 as seen from the exhaust port 140. The view shows the eight fuel injection ports 120, the eight swirlers 160, and the central plasma torch pilot light nozzle 130 as described in FIG. 2.

Figure 4:
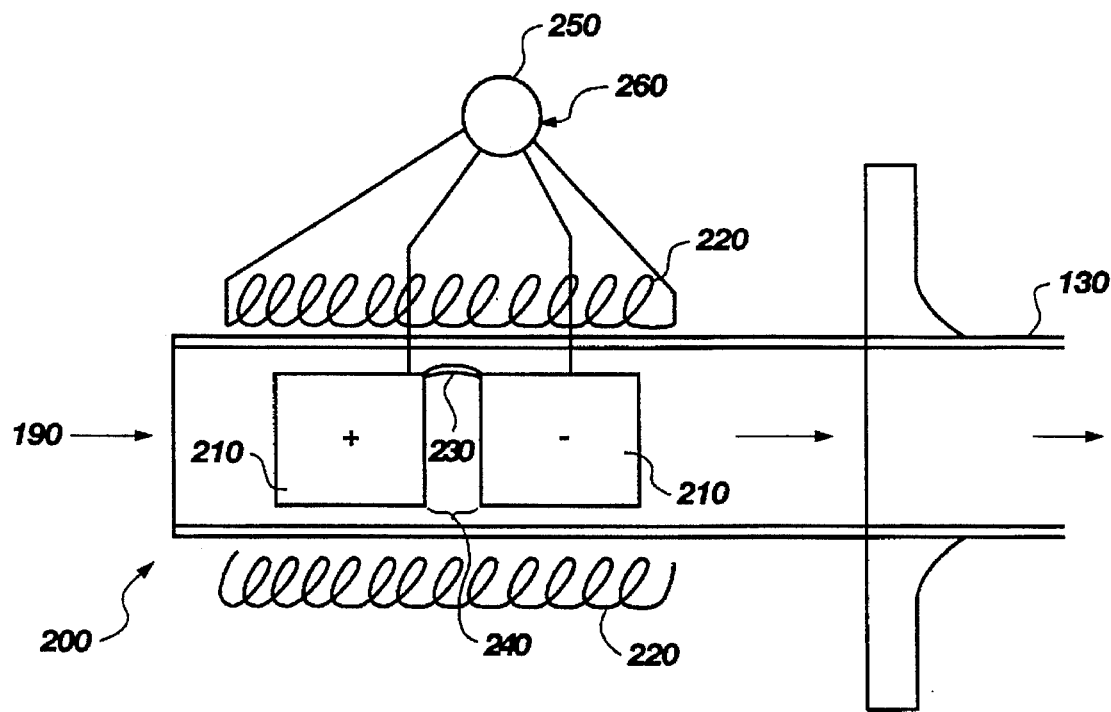
FIG. 4 is an elevational close-up cross-section view of the gas plasma torch pilot light used in the preferred embodiment of the present invention.

FIG. 4 is a close-up view of a plasma torch pilot flame as used in a preferred embodiment of the present invention. The plasma torch 200 is connected to the plasma torch pilot light nozzle 130, providing the plasma 180 which is discharged into the combustor basket 100.

A typical plasma torch 200 operates as follows. An electric arc 230 is generated within the plasma torch 200 between two hollow cylinders 210. The cylinders are placed end to end with a small gap 240 between them, one cylinder charged positively and the other being charged negatively. An electric arc 230 bridges the gap 240 when a sufficient potential difference is created between the cylinders 210 such that the dielectric property of the torch fuel 190 filling the gap 240 is overcome. When the torch fuel 190 is forced past the electric arc 230, the fuel 190 is heated to an ionized state to create a plasma 180. The plasma is forced into the plasma torch pilot light nozzle 130 which carries the plasma 180 to the combustor basket 100.

Controlling the temperature and volume of the plasma 180 being injected into the combustor basket 100 allows for much more precise control of turbine operation than is possible in conventional combustor designs. This control is important because low $NO_x$ combustion turbines can suffer from irregularities in sustained burning of the lean fuel/air mixture within the combustor basket 100. Because the amount of oxygen within the combustor basket 100 is necessarily low, even slight irregularities in thoroughly mixing fuel and air can cause combustion to almost cease or completely stop. A cycle of violent reignition of fuel and air followed by partial or total extinguishing of combustion can cause serious damage to the turbine.

To alleviate this problem, another advantage of the present invention is the addition of a monitoring device (FIG. 2, item 195) for determining combustion status within the combustor basket 100. While conventional combustors could also monitor combustion status, there is no practical purpose in their doing so because of the relatively slow response of a chemical pilot flame to adjustments in pilot flame output, whereas a plasma torch 200 can nearly instantaneously adjust plasma 180 temperature and volume. The monitoring device 195 is combined with a control device 250 that adjusts plasma 180 temperature and volume in response to a signal 260 from the monitoring device 195 which represents combustion status within the combustor basket 100.

While varying the volume of plasma 180 injected into the combustor basket 100 may take longer to have an impact on combustion because of the lag time between increased plasma 180 flow and actual plasma 180 injection into the combustor basket 100, a more immediate impact on the combustor basket 100 can be induced by increasing or decreasing the current in the plasma torch cylinders 210. The relatively short distance between plasma 180 creation in the plasma torch 200 and injection into the combustor basket 100 from the plasma torch pilot light nozzle 130 enables a rapid response to changing combustor conditions.

Some important practical considerations in operation of the plasma torch 200 include remembering that the potential difference required to bridge the gap 240 between cylinders 210 will vary depending upon the type of torch fuel 190 being used. Furthermore, to prevent scorching or burning of the cylinders 210 in the plasma torch 200, current is passed through coils 220 surrounding the torch 200 which cause the arc 230 to be in constant motion around the lip of the cylinders 210 which the arc 230 touches.

It should also be noted that the illustrated plasma torch 200 in FIG. 4 is not the only plasma torch design that may be implemented in the present invention, but is merely representative of the principles of operation. Alternative designs include injecting solid particles into the plasma stream after a torch fuel has been heated by the electric arc. The particles are heated by the plasma and assist in uniform distribution of plasma heat when finally injected into the combustor.

Figure 5:
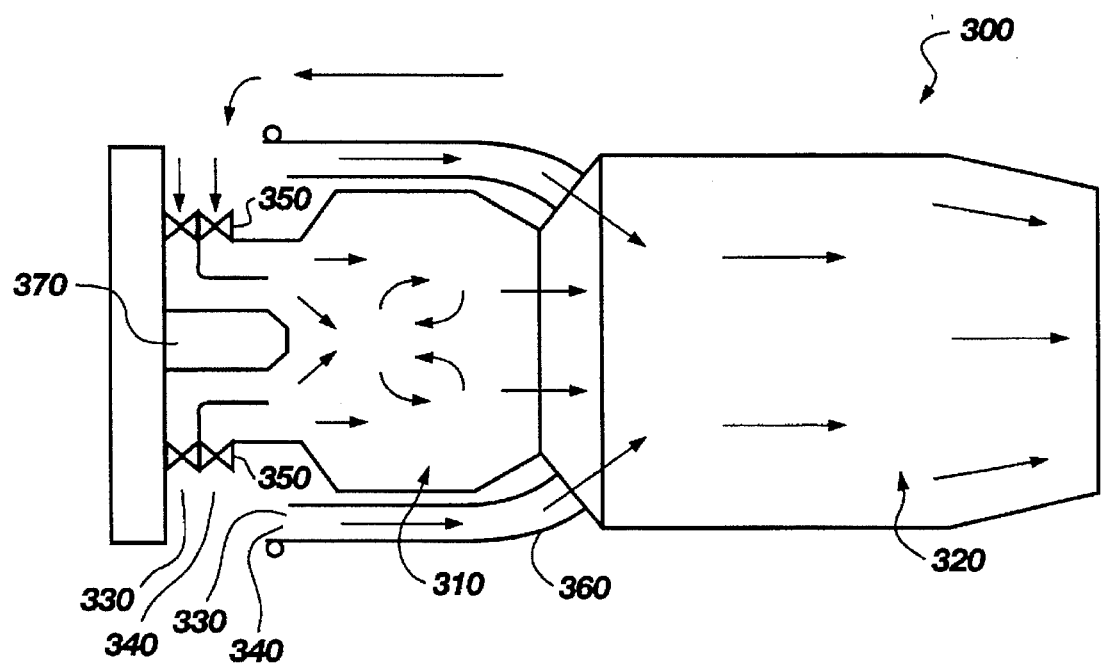
FIG. 5 is an elevational cross-section view of an alternative embodiment of the combustor basket shown in FIG. 2.
Figure 6:
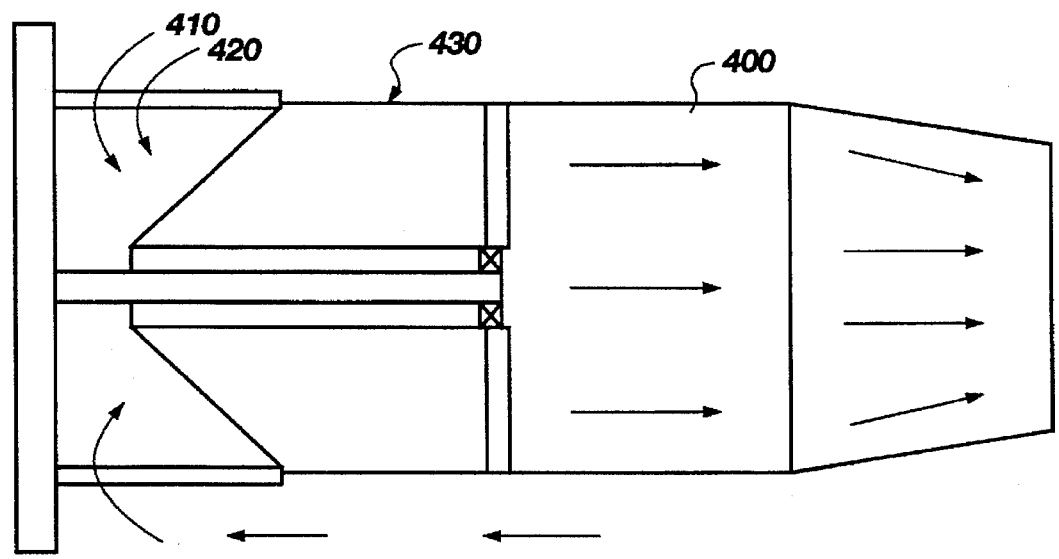
FIG. 6 is an elevational cross-section view of another alternative embodiment of the combustor basket shown in FIG. 2.

FIGS. 5 and 6 are included to illustrate an important concept of the present invention. Specifically, the combustor basket design may take many different forms, and the plasma torch can be integrated in most if not all conventional combustors. For example, while FIG. 2 shows that fuel and air are not mixed before being injected into the combustor basket 100, the combustor basket 100 of FIG. 5 shows a combustor 300 which consists of two combustor stages 310, 320 in series where very little mixing of fuel 330 and air 340 is done in the primary stage 310, but significant mixing is done before the fuel/air mixture reaches the secondary stage 320. Specifically, the primary stage 310 utilizes two counter directional radial inlet swirlers 350 for mixing fuel 330 and air 340 and stabilizing combustion in the primary stage 310. In the secondary stage 320, mixed fuel 330 and air 340 is fed from a long annulus 360. This annulus 360 provides the necessary length to achieve better mixing of the fuel 330 and air 340 before injection into the secondary combustor stage 320. The plasma torch pilot light nozzle 370 is still centered in a primary combustor stage 310.

FIG. 6 is another combustion turbine combustor basket 400 embodiment, and is provided only to show that mixing of fuel 410 and air 420 can be accomplished entirely before the mixture reaches the combustor 400. In this design, the fuel/air mixture enters the combustor 400 after being thoroughly mixed in a premixing/swirler section 430.

It is to be understood that the described embodiments of the invention are illustrative only, and that modifications thereof may occur to those skilled in the art. Accordingly, this invention is not to be regarded as limited to the embodiments disclosed, but is to be limited only as defined by the appended claims herein.

What is claimed is:

1. A low $NO_x$ combustion turbine combustor comprising:
   a combustor basket wherein a lean combustor fuel and air mixture is combusted, thereby creating exhaust gas and heat, said exhaust gas and heat being ejected from an exhaust port; an injection means coupled to the combustor basket for injecting the lean combustor fuel and air mixture into said combustor basket; at least one plasma torch pilot light nozzle coupled to the combustor basket; at least one plasma torch coupled to the at least one plasma torch pilot light nozzle, whereby a plasma is created from a torch fuel, passed to the at least one plasma torch pilot light nozzle and injected into the combustor basket to ignite the lean combustor fuel and air mixtures; monitoring means for determining a combustion status within the combustor basket; and control means responsive to an input signal from the monitoring means representing the combustion status, said control means actively controlling temperature and volume of the plasma produced from said plasma torch to thereby adjust combustion within the combustor basket.

2. The low $NO_x$ combustion turbine combustor as defined in claim 1, wherein the injection means comprises:

at least one combustor fuel injection port having a plurality of dispersing apertures whereby the combustor fuel is spread evenly throughout the combustor basket to reduce concentrations of fuel to obtain more evenly distributed combustion; and at least one air inlet to enable combustion within the combustor basket.

3. The low $NO_x$ combustion turbine combustor as defined in claim 1, wherein the injection means comprises at least one premixed combustor fuel and air injection port having a plurality of dispersing apertures whereby the combustor fuel and air is spread evenly throughout the combustor basket to reduce concentrations of fuel to obtain more evenly distributed combustion.

4. The low $NO_x$ combustion turbine combustor as defined in claims 2 or 3, wherein the injection means further comprises a swirler means for further mixing and evenly distributing the combustion fuel and air within the combustor basket.

5. The low $NO_x$ combustion turbine combustor as defined in claim 1, wherein the at least one plasma torch includes means for developing an electric arc to heat the torch fuel to create a plasma which is passed to the at least one plasma torch pilot light nozzle, wherein the temperature of the plasma is sufficiently high to cause the combustor fuel and air to ignite when in contact with the plasma in the combustor basket.

6. The low $NO_x$ combustion turbine combustor as defined in claim 5, wherein the torch fuel which is ionized in the plasma torch to create a plasma that is discharged from the plasma torch pilot light nozzle into the combustor basket is selected from the group comprising natural gas, hydrogen and fuel oils.

7. The low $NO_x$ combustion turbine combustor as defined in claim 1, wherein the combustor comprises eight tubular combustor fuel injection ports arranged in a generally circular pattern and projecting into the combustor basket, pointed along a lengthwise axis toward the exhaust port, and wherein fuel is discharged from the injection ports through four holes bored laterally with respect to the lengthwise axis;

eight air inlets, wherein each of the eight air inlets is associated with each of the eight fuel injection ports to form air inlet and fuel injection port pairs;

eight swirling means for mixing and evenly distributing combustor fuel and air within the combustor basket, wherein one swirling mean is associated with each of the air inlet and fuel injection port pairs, and disposed around a base of each fuel injection ports so as to direct the flow of air and fuel entering the combustor toward the exhaust port; and a plasma torch pilot light nozzle disposed in the center of the generally circular pattern of fuel injection ports so as to direct discharged plasma toward the exhaust port.

8. The low $NO_x$ combustion turbine combustor as defined in claim 7, wherein the eight swirling means are tilted at approximately a 25 degree angle with respect to an axis perpendicular to the fuel injection ports.

9. The low $NO_x$ combustion turbine combustor as defined in claim 1, wherein the plasma torch further comprises control means for varying temperature and volume of the plasma, and wherein the control means receives an input signal from the monitoring means.

10. The low $NO_x$ combustion turbine combustor as defined in claim 1, wherein the combustor fuel is selected from the group consisting of natural gas, hydrogen and fuel oils.

* * * * *